United States Patent
Herfurth et al.

(10) Patent No.: US 9,763,289 B2
(45) Date of Patent: Sep. 12, 2017

(54) SYSTEM AND METHOD FOR A SWITCHED-MODE POWER SUPPLY

(71) Applicant: Infineon Technologies Austria AG, Villach (AT)

(72) Inventors: Michael Herfurth, Gilching (DE); Xiao Wu Gong, Singapore (SG); Yong Siang Teo, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 128 days.

(21) Appl. No.: 14/675,026

(22) Filed: Mar. 31, 2015

(65) Prior Publication Data

US 2016/0291682 A1   Oct. 6, 2016

(51) Int. Cl.
| | |
|---|---|
| H02M 3/156 | (2006.01) |
| H05B 33/08 | (2006.01) |
| H02M 3/158 | (2006.01) |
| H02M 7/217 | (2006.01) |
| H02M 1/00 | (2006.01) |

(52) U.S. Cl.
CPC .......... *H05B 33/08* (2013.01); *H02M 3/1582* (2013.01); *H02M 7/2176* (2013.01); *H05B 33/0803* (2013.01); *H02M 2001/0003* (2013.01)

(58) Field of Classification Search
CPC ............ H02M 3/156–3/157; H02M 2001/003; H02M 2001/0003
See application file for complete search history.

(56) References Cited

U.S. PATENT DOCUMENTS

| | | | |
|---|---|---|---|
| 8,928,231 B2 | 1/2015 | Campos et al. | |
| 2011/0148313 A1* | 6/2011 | Ramaker | H05B 33/0815 315/185 R |
| 2014/0159694 A1* | 6/2014 | Usuda | H02M 3/157 323/285 |

OTHER PUBLICATIONS

"Non-isloated Buck Offline LED Driver," BP2832A, Rev. 1.0, BPSemiconductor, www.bpsemi.com, Jun. 2014, 8 pgs.

(Continued)

*Primary Examiner* — Harry Behm
(74) *Attorney, Agent, or Firm* — Slater Matsil, LLP

(57) ABSTRACT

In accordance with an embodiment, a switched-mode power converter includes a switch, a freewheeling diode coupled between an output terminal of the switch and a power supply input node, an inductor coupled between the output terminal of the switch and a power supply output node, and a passive network having a first terminal coupled to the output terminal of the switch, a second terminal coupled to a power supply output node, and a third terminal coupled to a reference terminal of the switch. A method includes measuring a first voltage at a fourth terminal of the passive network when the switch is on; measuring a second voltage at the fourth terminal of the passive network when the switch is off; and estimating an output voltage between the power supply output node and the reference terminal of the switch based on the first voltage and the second voltage.

21 Claims, 7 Drawing Sheets

(56) References Cited

OTHER PUBLICATIONS

"Mains dimmable controller for LED lighting," SSL5301T, Preliminary Data Sheet, Rev. 1, Jun. 2, 2014, 22 pgs.

"Off-Line Digital Power Controller for LED Driver with High Power Factor and Low-Ripple Current," iW3625 Product Summary, Rev. 0.2 Preliminary, Dialog Semiconductor (UK) Ltd., 2014, 5 pgs, December.

"AC/DC Advanced Digital Power Controller for Single-Stage Dimmable LED Drivers," iW3688 Product Summary, Rev. 0.8 Preliminary, Dialog Semiconductor (UK), 2014, 6 pgs, December.

* cited by examiner

SYSTEM AND METHOD FOR A SWITCHED-MODE POWER SUPPLY

TECHNICAL FIELD

The present disclosure relates generally to an electronic device, and more particularly to a system and method for a switched mode power supply.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy loss due to power dissipation across resistive voltage drops.

A SMPS usually includes at least one switch and an inductor or transformer. Some specific topologies include buck converters, boost converters, and flyback converters, among others. A control circuit is commonly used to open and close the switch to charge and discharge the inductor. In some applications, the current supplied to the load and/or the voltage supplied to the load is controlled via a feedback loop.

One application of an SMPS is as a power supply for a light emitting diode (LED), such as those used in residential and commercial lighting applications to replace incandescent light bulbs and compact florescent lamps (CFL). In some applications, a SMPS is used to convert an AC line voltage to a DC current in order to power the LED.

SUMMARY OF THE INVENTION

In accordance with an embodiment, a switched-mode power converter includes a switch, a freewheeling diode coupled between an output terminal of the switch and a power supply input node, an inductor coupled between the output terminal of the switch and a power supply output node, and a passive network having a first terminal coupled to the output terminal of the switch, a second terminal coupled to a power supply output node, and a third terminal coupled to a reference terminal of the switch. A method includes measuring a first voltage at a fourth terminal of the passive network when the switch is on; measuring a second voltage at the fourth terminal of the passive network when the switch is off; and estimating an output voltage between the power supply output node and the reference terminal of the switch based on the first voltage and the second voltage.

BRIEF DESCRIPTION OF THE DRAWINGS

For a more complete understanding of the present invention, and the advantages thereof, reference is now made to the following descriptions taken in conjunction with the accompanying drawings, in which.

Figure 1A:
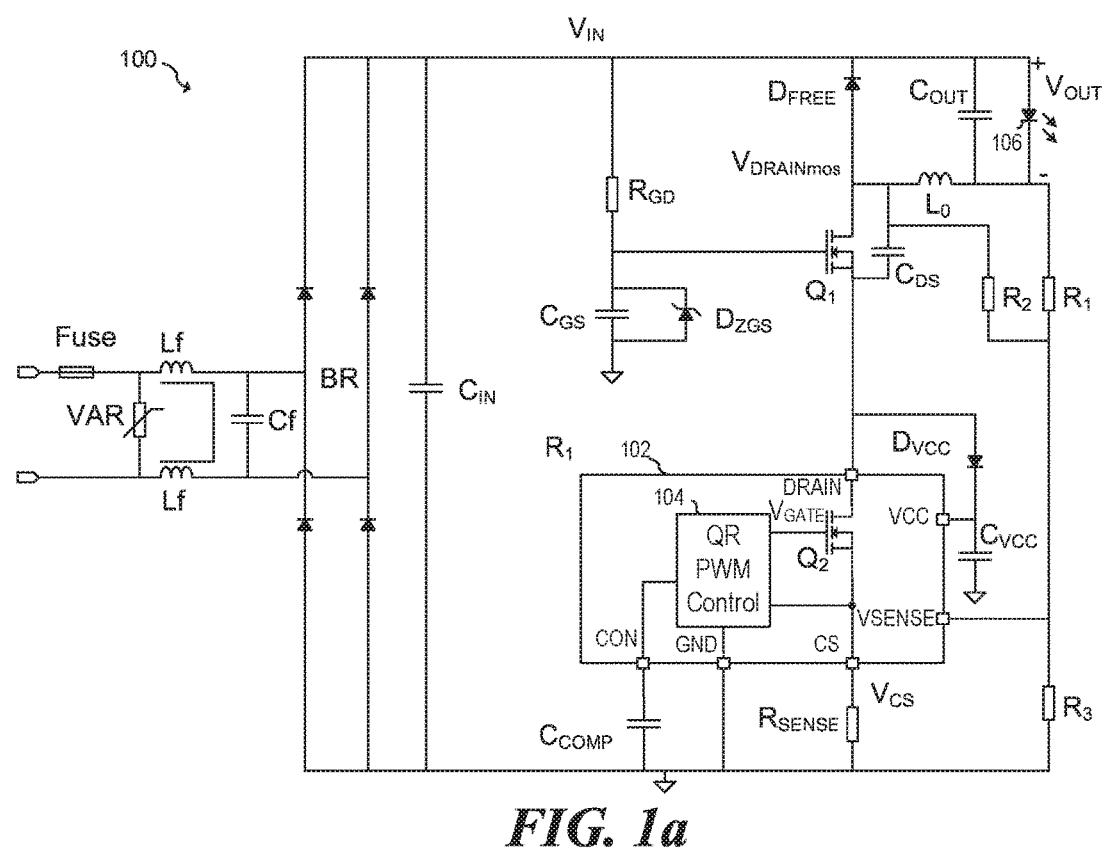
FIGS. 1a-1b illustrate a schematics of an embodiment switched-mode power supplies.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for switched mode buck converter for light emitting diodes (LEDs). Embodiments of the present invention may also be applied to other switched-mode power supply configurations and other systems and applications including other circuits that switch including, but not limited to, power systems and motor control systems.

In many conventional LED lighting systems, LEDs are powered using a switched mode power supply having a control system that regulates the average output current delivered to the LED. By regulating the average output current of the switched-mode power supply, the light intensity provided by the LED can be controlled. For example, by lowering the average current provided to the LED, the light output can be made dimmer, while increasing the average current provided to LED can make the light output brighter. During normal operation of an LED, the output voltage of the switched mode power supply is generally determined by the junction voltage of the LEDs, which has a logarithmic relationship to current of the LED. In many systems, multiple LEDs may be driven by a switched-mode power supply. These LEDs may be coupled in series, in parallel, or in a combination of series and parallel circuits.

If the LEDs are removed from the switched-mode power supply, however, the current regulation loop will attempt to continue providing the constant current to its output terminals. Because the switched-mode power supply is presented with a high impedance load with the removal of the LEDs, the attempt to supply a constant current will cause an increase in the output voltage of the switched-mode power supply. If this voltage continues to increase beyond the safe operating voltages of the various power supply components, damage to the power supply may result, as well as the potential for a fire hazard caused by arcing or heating of the components. This is especially pertinent in switched-mode buck converters that operate off an AC power-line voltages of 110V or 220V. One way to address the issue of hazardous overvoltage conditions is to measure the output voltage of the switched-mode power supply and shutdown the switched mode power supply when the output voltage exceeds a predetermined threshold.

There are a number of conventional circuits and methods that may be used to measure the output voltage of a switched-mode power supply. For example, an auxiliary winding coupled to a main transformer of a flyback converter could be used to provide an output voltage measurement to the primary side of the switched-mode power supply. Another conventional method includes measuring the demagnetization time Tovp of an inductance within the switched-mode power supply. For example, demagnetization time Tovp of a switched-mode power supply may calculated as follows:

$$T_{ovp} = \frac{L \times V_{CS}}{R_{CS} \times V_{ovp}}, \quad (1)$$

where L is the inductance of the inductor coupled to the power supply switch, $R_{CS}$ is the resistance of a resistor coupled in series with the source of a switching transistor, $V_{CS}$ is the voltage at the source of the switching transistor and $V_{OVP}$ is the output voltage that corresponds to $T_{ovp}$. As is clear from equation (1), demagnetization time Tovp is proportional to the inductance L of the power supply inductor. Moreover, the accuracy of the demagnetization time method may also be dependent on the absolute value of a capacitance of a timing capacitor and/or the time constant of an RC circuit used to measure $T_{ovp}$. Because of the potentially wide tolerance of the value of inductance L, the timing capacitance and/or the RC time constant, the resulting measurement may also have a wide tolerance, resulting in inaccurate measurements.

In one specific embodiment, a buck converter for powering a light emitting diode includes a buck converter circuit having a switch coupled in series with a cascode transistor. An inductor and a freewheeling diode are coupled to the drain of the cascode transistor, and a load, such as an LED is coupled to the inductor. During operation, a pulse width modulated signal is provided to the switch in order to control the current through the switch to a first predetermined current. In an embodiment of the invention, the output voltage of the buck converter is estimated by measuring a voltage of a node of a passive network coupled to two terminals of the inductor and to a reference terminal such as ground. A first measurement is made when the switch of the switched-mode power supply is on, and a second measurement is made when the switch of the switched-mode power supply is off. By subtracting the first measurement from the second measurement, the output voltage of the switched-mode power supply can be estimated. In some embodiments, the estimated output voltage is compared with a predetermined threshold, and the power supply is shut down when the estimated output voltage exceeds the predetermined threshold.

FIG. 1a illustrates an embodiment buck converter power supply system 100 that includes a buck converter C 102 coupled to load circuit 106 represented as an LED via cascode transistor $Q_1$ and inductor $L_0$. IC 102, includes a control circuit 104 coupled to switching transistor $Q_2$. During operation, control circuit 104 provides a pulse width modulated (PWM) signal to the gate of switching transistor Q2 using, for example a quasi-resonant mode of operation. Control circuit 104 determines a current flowing through switching transistor $Q_2$ by measuring a voltage across resistor $R_{SENSE}$, and adjusts the pulse width of the (PWM) in order to produce a fixed average current through inductor $L_0$. The measured voltage across resistor $R_{SENSE}$ may be further processed by performing a peak detection of the voltage, determining an average voltage, or other type of calculation. When switching transistor $Q_2$ is activated, current flows through switching transistor $Q_2$, cascode transistor $Q_1$, inductor $L_0$ and load circuit 106. When switching transistor $Q_2$ is deactivated, current flows through load circuit 106, inductor $L_0$, and freewheeling diode $D_{free}$.

Diode bridge BR rectifies input voltage VAC, which may be an AC input line voltage to provide a DC input voltage $V_{IN}$ to power supply system 100. The gate of cascode transistor $Q_1$ is biased via resistor $R_{GD}$ and zener diode $D_{ZGD}$. Capacitor $C_{GS}$ is coupled in parallel to zener diode $D_{ZGS}$ and is used to filter voltage ripple at the output of diode bridge BR from appearing at the gate of cascode transistor $Q_1$. Supply voltage VCC is produced for IC 102 via diode $D_{VCC}$. The voltage of VCC is about $V_{DZ}$-Vth1-$V_{DVCC}$, where $V_{DZ}$ is the zener voltage of $V_{ZGS}$, Vth1 is the threshold voltage of cascode transistor $Q_1$ and $V_{DVCC}$ is the forward voltage of diode $D_{VCC}$. For example, if the zener voltage of diode $D_{ZGS}$ is about 12 V, the threshold of cascode transistor $Q_1$ is about 3V, and the forward voltage of diode $D_{VCC}$ is 0.7 V, the resulting voltage at the VCC pin of IC 102 is about 8.3 V during startup. After IC 102 has started up, VCC is charged by capacitor $C_{DS}$ through diode $D_{VCC}$.

As is further shown in FIG. 1a, a fuse, a varistor VAR for limiting transient input voltages and a filter including inductors Lf and capacitor Cf that is used for EMI suppression during switched mode operation. Capacitor $C_{DS}$ provides a feed forward path from inductor $L_0$ to IC 102 for the use of zero voltage or valley detection for the quasi-resonant mode of operation. For example, after switching transistor $Q_2$ is turned off and inductor $L_0$ has been demagnetized, freewheeling diode $D_{free}$ becomes reversed bias and the drain node of cascode transistor $Q_1$ begins to ring or oscillate at a frequency determined by the value of inductor $L_0$ and the value of capacitance coupled to the drain of cascode transistor $Q_1$. By detecting minimum voltage at the drain of cascode transistor Q1 during this period of ringing, and turning on switching transistor $Q_2$ when the voltage at the drain of cascode transistor $Q_1$ is at a minimum, switching losses may be reduced. Various valley switching and quasi-resonant circuits and systems known in the art may be used to implement valley switching and the quasi-resonant mode of operation in the various embodiments of the present invention.

Integrated circuit 102 includes six pins: DRAIN, CS, VCC, GND, CON and VSENSE. The DRAIN pin and the CS pins are coupled to the drain and source terminals of switching transistor $Q_2$, respectively. The VCC pin and the GND pin are coupled to the power supply for the internal circuitry of integrated circuit 102, and the CON pin interfaces with external capacitor $C_{COMP}$ that is used to establish timing of the pulse width modulated signals provided by control circuit 104. In an embodiment, external capacitor CCOMP is used to measure output current such that the output current may be controlled to have a constant average output current. The VSENSE pin is coupled to the output of a passive measurement network that includes resistors $R_1$, $R_2$ and $R_3$ coupled to inductor $L_0$ and to ground. The voltage at the VSENSE pin may be used, for example, to estimate output voltage $V_{OUT}$ of the buck converter.

During operation of the power supply system 100, when transistor $Q_2$ is activated during a gate-on period when QR PWM control circuit 104 asserts gate drive signal $V_{GATE}$, the drain node $V_{DRAINmos}$ of transistor $Q_1$ is pulled down near ground potential. Accordingly, $R_2$ may be considered as being connected in parallel with $R_1$. If $R_2$>>$R_3$, the resistance of the parallel combination of $R_2$ and $R_3$ approximately equal to $R_3$. When $R_2$ is chosen to have the same resistance value as $R_1$, the voltage $V_{ON}$ at the VSENSE pin of integrated circuit 102 during the gate-on period can be expressed as:

$$V_{ON} = \frac{(V_{IN} - V_{OUT}) \times R_3}{R_3 + R_1}. \quad (2)$$

In one example, the value of $R_1$ and $R_2$ is about 1 MΩ and the value of $R_3$ is about 10 KΩ. Alternatively, other values may be used.

During the gate-off period, current flows from inductor $L_0$ through freewheeling diode $D_{FREE}$, thus the voltage at node $V_{DRAINmos}$ is pulled up to a diode voltage above input voltage. In some embodiments, the voltage at node $V_{DRAINmos}$ may be considered to be approximately power supply input voltage $V_{IN}$. Hence, the voltage at the VSENSE pin during the gate-off period may be approximated as below:

$$V_{OFF} \approx \left[\frac{(V_{IN} - V_{OUT})}{R_3 + R_1} + \frac{V_{IN}}{R_3 + R_1}\right] \times R_3. \quad (3)$$

By substituting equation (3) into equation (2), the output voltage can be approximated as follows:

$$V_{OUT} \approx \left[\frac{R_3 + R_1}{R_3}\right] \times (V_{OFF} - 2V_{ON}). \quad (4)$$

From equation (4), it can be seen that by measuring the voltage level at the VSENSE pin when transistor $Q_2$ is turned-on and when transistor $Q_2$ is turned-off, the output voltage transistor $Q_2$ is turned-on, the output voltage $V_{OUT}$ of power supply system 100 may be indirectly estimated. In alternative embodiments of the present invention, the same detection principle may also be applied to other switched-mode power converter topologies including, but not limited to a buck-boost topology.

Figure 1B:
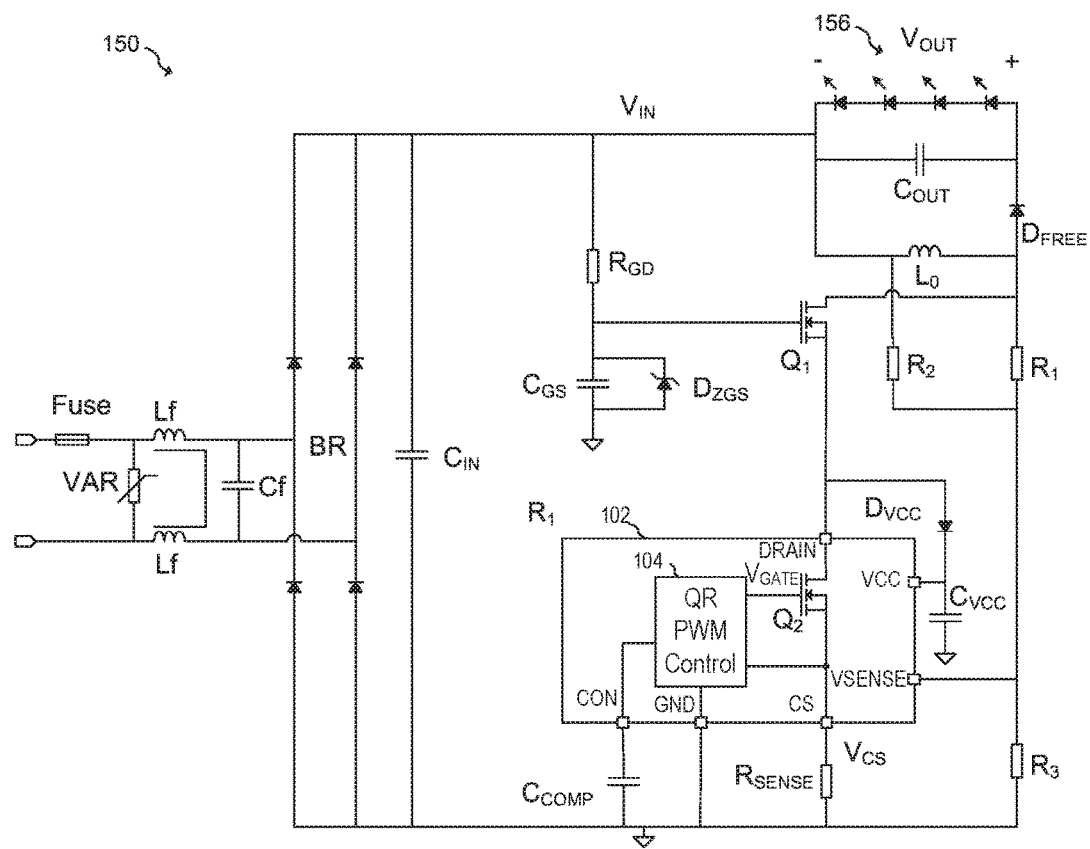

FIG. 1b illustrates an embodiment buck-boost converter power supply system 150 that includes IC 102 coupled to load circuit 156 represented as a plurality of series connected LEDs via cascode transistor $Q_1$, inductor $L_0$, and freewheeling diode $D_{FREE}$. Buck-boost converter power supply system 150 differs from buck converter power supply system 100 shown in FIG. 1a, in that freewheeling diode $D_{FREE}$ is connected in series with load circuit 156 instead of being connected directly between the drain of transistor $Q_1$ and voltage Vin. Sensing of the voltage across inductor $L_0$ is and the derivation of $V_{OUT}$ proceeds according to similar principles as the buck converter power supply system 100 shown in FIG. 1a.

Figure 2A:
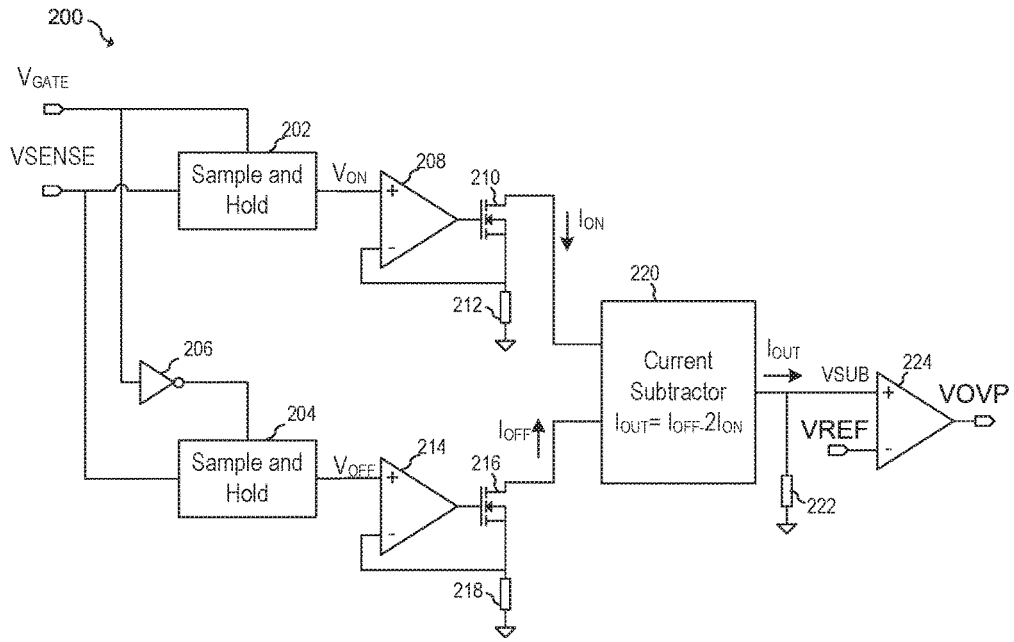
FIGS. 2a-2c illustrate schematics of various embodiments output voltage estimation circuits.
Figure 2B:
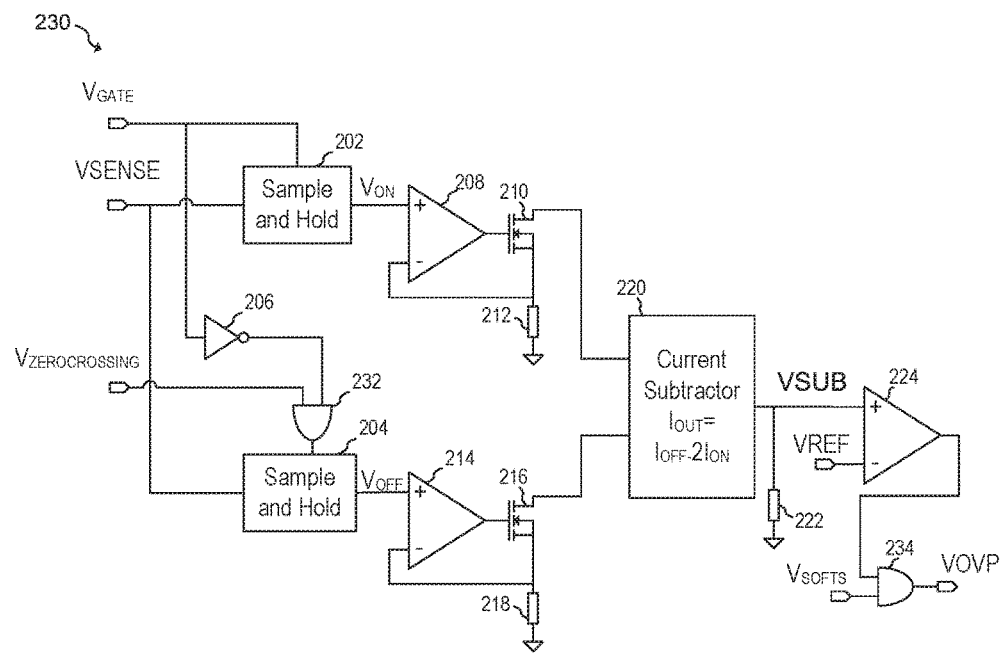

FIGS. 2a and 2b illustrate embodiment circuits that may be used to implement embodiment output voltage estimation systems and methods. For example, FIG. 2a illustrates embodiment output voltage estimation circuit 200 in which the voltage at the VSENSE pin is sampled when transistor $Q_2$ is activated using sample and hold circuit 202, sampled when transistor $Q_2$ is deactivated using sample and hold circuit 204. The sampled VSENSE values are converted into currents using voltage-to-current converter circuits, the output currents of which are subtracted, converted into a voltage and compared with a predetermined threshold.

More specifically, when gate drive voltage $V_{GATE}$ is high, sample and hold circuit 202 samples the voltage at pin VSENSE to produce sampled voltage $V_{ON}$. A transconductance amplifier including amplifier 208, transistor 210 and resistor 212 converts voltage $V_{ON}$ into current $I_{ON}$. The loop-gain of amplifier 208 and transistor 210 forces the voltage across resistor 212 to be about equal to $V_{ON}$. Accordingly, the transconductance amplifier produces a current $I_{ON}$ that is about equal to $V_{ON}/R_{212}$. Similarly, when gate drive voltage $V_{GATE}$ is low, sample and hold circuit 202 samples the voltage at pin VSENSE to produce sampled voltage $V_{OFF}$. Inverter 206 may be used to activate sample and hold circuit 204 when $V_{GATE}$ is low. Transconductance amplifier including amplifier 214, transistor 216 and resistor 218 converts voltage $V_{OFF}$ into current $I_{OFF}$ that is about equal to $V_{OFF}/R_{218}$.

In an embodiment, sample and hold circuits 202 and 204 may be implemented using a switch transistor followed by a capacitor. Alternatively, other sample and hold circuits known in the art may be used.

In an embodiment, amplifiers 208 and 214 may be implemented using operational amplifiers, and transistors 210 and 216 may be implemented using n-channel MOSFETs. Alternatively, other types of amplifiers and other types of transistors may be used. For example, in some embodiments, a BJT or a JFET, a p-channel MOSFET or other type of transistor may be used in places of transistors 210 and 216. In further embodiments, other voltage-to-current converters and/or transconductance amplifiers known in the art may also be used. Moreover, in further embodiment, the logic sense of $V_{GATE}$ may be inverted.

Current subtractor circuit 220 subtracts current $I_{ON}$ from $I_{OFF}$ according to the relationship $I_{OUT} = I_{OFF} - 2 I_{ON}$. The output of current subtractor is applied to resistor 222 to form a voltage VSUB according to the relationship $VSUB = I_{OUT}/R_{222}$. Next, voltage VSUB is compared to reference voltage VREF using comparator 224. In some embodiments, if voltage VSUB is greater than reference voltage VREF, overvoltage signal VOVP is asserted signifying an overvoltage condition. Overvoltage signal VOVP may be used to shut down the power supply in the event of an overvoltage condition. Current subtractor circuit 220 may be implemented, for example, using a current mirror. Comparator 224 may be implemented using an amplifier or comparator circuits known in the art.

In some embodiments, the various components, such as resistors 212, 218 and 222 and the size ratios of current mirrors within subtractor 220 as are scaled such that voltage VSUB has the following relationship:

$$VSUB = (V_{OFF} - 2V_{ON}) \approx \left[\frac{R_3}{R_3 + R_1}\right] \times V_{OUT}.$$

Alternatively, VSUB may be scaled differently.

It should be further understood that other circuit topologies may be used to implement embodiment output voltage estimation circuits. For example, instead of converting the sample voltages into currents, the equation (4) may be calculated in the voltage domain. In a further embodiment, the voltage of the VSENSE pin may be digitized using an analog-to-digital converter and the estimated output voltage may be calculated in the digital domain using a processor, microcontroller, dedicated logic circuit or other digital circuit.

FIG. 2b illustrates embodiment output voltage estimation circuit 230 configured to sample VSENSE when the current through freewheeling diode $D_{FREE}$ (FIG. 2) is zero. In an embodiment, this condition may be sensed by using zero-crossing detection circuitry within switched-mode buck converter IC 102. In an embodiment, this condition is sensed at the DRAIN pin of IC 102. For example, when diode $D_{FREE}$ is no longer forward biased, the impedance at node $V_{DRAINmos}$ increases significantly and starts the onset of an underdamped quasi-resonant condition that causes the voltage at $V_{DRAINmos}$ to quickly drop. This drop in voltage is coupled to the DRAIN pin of IC 102 via capacitor $C_{DS}$ and sensed by circuitry in IC 102 using zero crossing by valley detection circuits and systems known in the art. When this condition is sensed, $V_{ZEROCROSSING}$ is asserted. Logic AND gate 232 may be used, for example to ensure that sample and hold circuit 204 samples the voltage at pin VSENSE only when $V_{GATE}$ is low and $V_{ZEROCROSSING}$ is asserted.

In an embodiment, overvoltage protection is activated after a soft start period, for example, when the output of the switched-mode power is low and is operating continuous conduction mode. In order to ensure that the overvoltage protection circuit does not mistrigger during this time, the output of comparator 224 is ANDed with soft start signal $V_{SOFTS}$ using AND gate 234, which may be asserted a predefined period of time after system start-up.

Figure 2C:
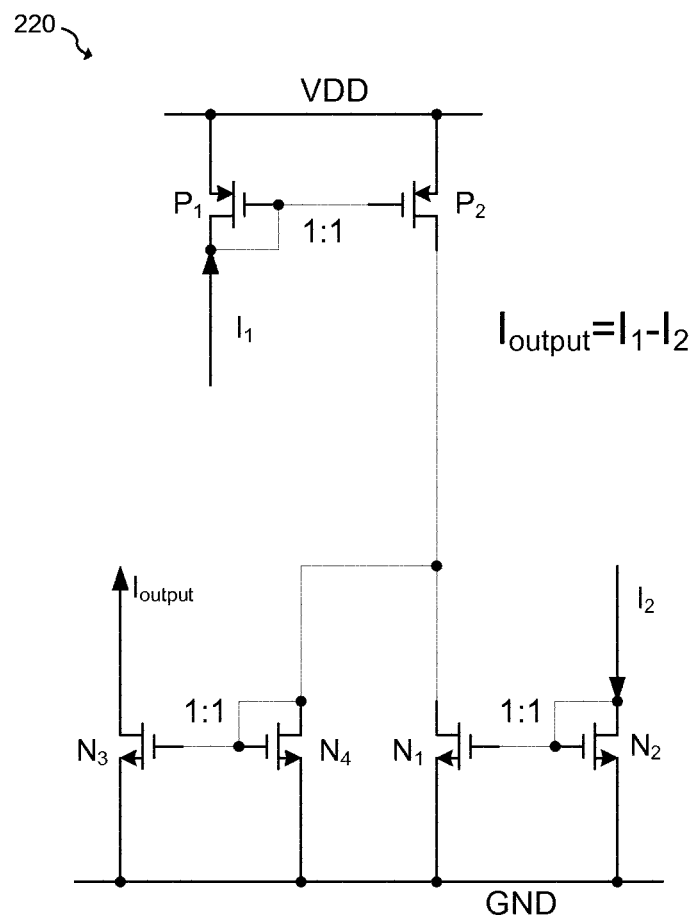

FIG. 2c illustrates an embodiment implementation of current subtractor circuit 220 that implements the equation $I_{OUTPUT}=I_1-I_2$. As shown, input current $I_1$ is mirrored by PMOS transistors $P_1$ and $P_2$ and input current $I_2$ is mirrored by NMOS transistors $N_2$ and $N_1$. These mirrored currents are subtracted at the drains of PMOS transistor $P_2$ and NMOS transistor $N_1$. The result of this current subtraction is then mirrored by NMOS transistors $N_4$ and $N_3$ to form current $I_{OUTPUT}$ at the drain of NMOS transistor $N_3$. It should be understood that the circuit shown in FIG. 2c is just one of many possible embodiment current subtraction circuits that may be used to implement current subtractor circuit 220. Alternatively, other equivalent and similar circuits may be used.

Figure 3:
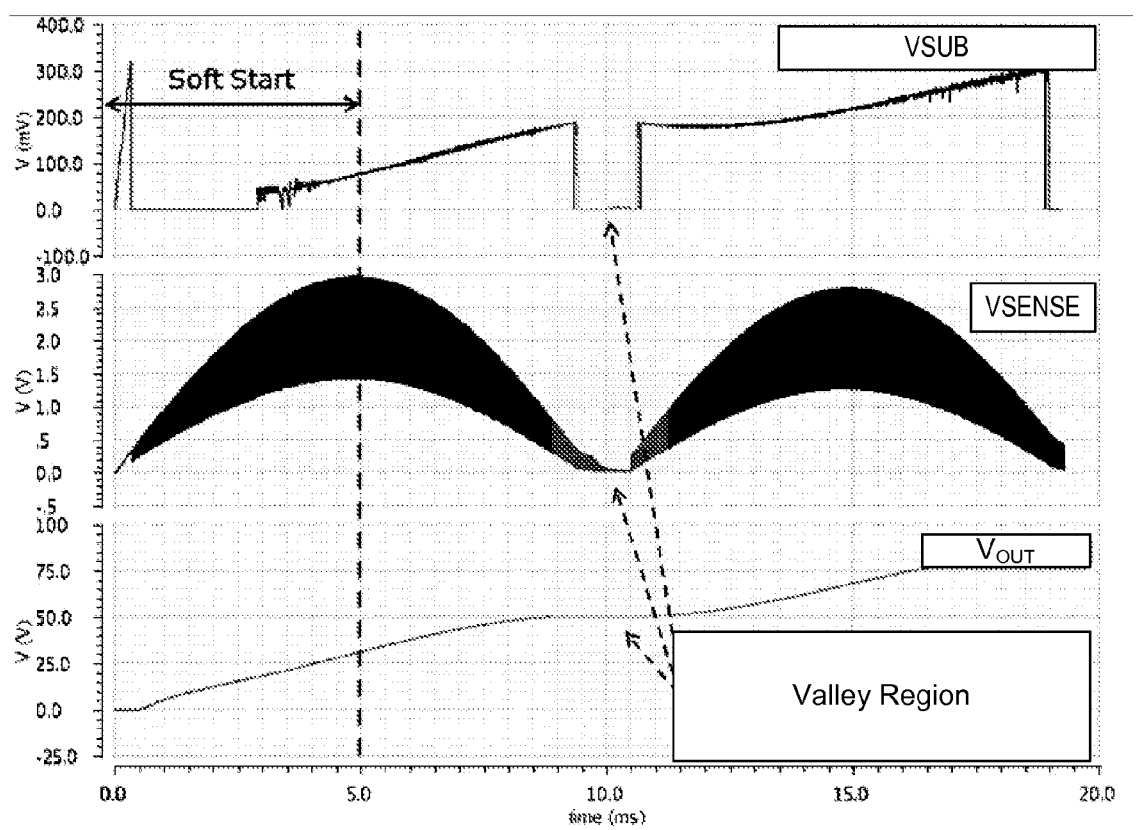
FIG. 3 illustrates a waveform diagram showing the operation of an embodiment output voltage estimation circuit.

FIG. 3 illustrates a waveform diagram of a simulation of an embodiment output voltage estimation circuit that is powering up. Waveform VSUB represents the estimated output voltage, waveform VSENSE represents the voltage a pin VSENSE of IC 102, and waveform $V_{OUT}$ represents the output voltage of an embodiment switched-mode buck converter. As shown, output voltage $V_{OUT}$ starts increasing during the initial soft start period; estimated voltage VSUB increases accordingly. As described above, overvoltage protection may be disabled during this soft start period. As shown, estimated voltage VSUB drops out in a valley region of the input voltage. This valley region corresponds to a case in which the rectified input AC line voltage is near zero, which causes the input voltage $V_{IN}$ to the switched-mode power supply to be momentarily too low to charge the output capacitor and too low derive an output voltage estimation. This momentary dropout of the estimated output voltage is not an issue because the power supply output cannot be further charged to cause an overvoltage condition under these circumstances.

Figure 4:
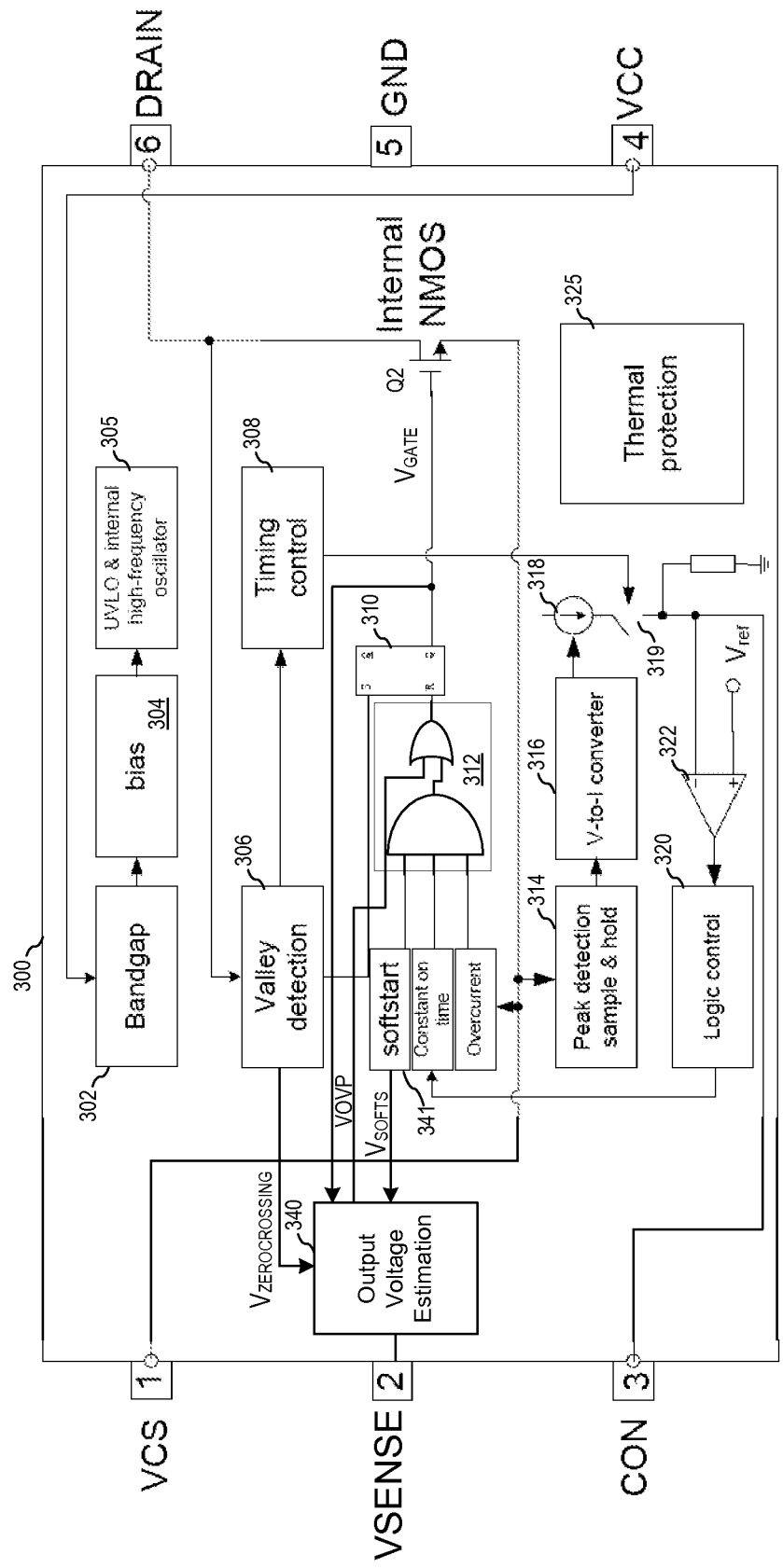
FIG. 4 illustrates an embodiment integrated circuit.

FIG. 4 illustrates IC 300 that may be used to implement buck converter IC 102 in the various embodiments described above. IC 300 includes output voltage estimation block 340 coupled to VSENSE pin 2 that may be implemented according to any of the embodiments described above. Output voltage estimation block 340 monitors signal GATE used to drive transistor Q2 and produces over voltage signal VOVP. For embodiments in which the VSENSE is sampled when transistor Q2 is off and when a zero-crossing or valley condition is detected, output voltage estimation block 340 also monitors soft start signal $V_{SOFTS}$ produced by soft start block 341 and signal $V_{ZEROCROSSING}$ produced by valley detection circuit 306.

IC 300 further includes an internal NMOS transistor Q2 that is used to implement the switching transistor. The gate of transistor Q2 is driven by the output of latch 310, which is activated by valley detection circuit 306 and deactivated by logic circuit 312 that resets latch 310. Latch 310 may be reset when the outputs of a soft start block, a constant on-time block and an overcurrent block are high and/or when the VOVP output of output voltage estimation block is asserted as determined by logic circuit 312. Effectively, when VOVP is asserted, transistor Q2 is shut down. It should be understood that the implementation of logic circuit 312 shown in FIG. 3 is just one example of a number of possible logic circuits that may perform a similar function.

In an embodiment, the output of the soft start block is high after IC 300 has powered up, and the output of the overcurrent block is high when there is not an overvoltage condition. The constant on time block provides an on-time that is based on a measured voltage of pin VCS, as well as a value of an external capacitor that is coupled to pin CON. Peak detection sample and hold block 314 samples a voltage of pin VCS and voltage to current converter 316 converts this measured peak value to a current via current source 318. When timing control block 308 activates switch 319, the external capacitor coupled to pin CON is charged until the voltage of pin CON reaches voltage Vref as determined by comparator 322. Logic control block 320 monitors the output of comparator 322 and activates the constant on time block when the input of comparator 322 crosses threshold voltage Vref.

Bias to IC 300 is provided by bandgap 302 and bias generation block 304. IC 300 further includes an under voltage lockout mechanism and an oscillator in block 305, as well as a thermal protection block 325 that includes temperature sensor and thermal protection circuits. It should be appreciated that IC 300 is one example of many possible embodiment buck converter controller ICs. In alternative embodiments, other controller circuits and systems may be used.

Figure 5:
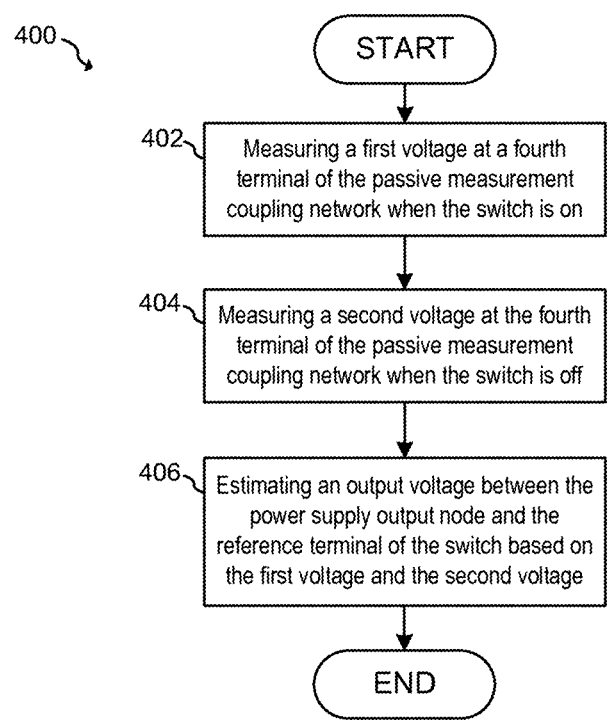
FIG. 5 illustrates a block diagram of an embodiment method.

FIG. 5 illustrates a block diagram of an embodiment method 400 of operating a switched-mode power converter that includes a switch, a freewheeling diode, an inductor, and a passive measurement coupling network. An output terminal of the switch is coupled to a power supply input node via the freewheeling diode, and is coupled to a power supply output node via an inductor. The passive measurement coupling network has a first terminal coupled to the output terminal of the switch, a second terminal coupled to a power supply output node, and a third terminal coupled to a reference terminal of the switch. In some embodiments, the passive measurement coupling network includes a first resistor coupled between the second terminal and the fourth terminal of the passive measurement coupling network; a second resistor coupled between the first terminal and the fourth terminal of the passive measurement coupling network; and a third resistor coupled between the third terminal and third terminal of the passive measurement coupling network.

In step 402, a first voltage at the fourth terminal of the passive measurement coupling network is measured when the switch is on. Next, in step 404, a second voltage at the fourth terminal of the passive measurement coupling network is measured when the switch is off. In step 406, an output voltage between the power supply output node and the reference terminal of the switch is estimated based on the first voltage and the second voltage. The output voltage may be estimated, for example, according to equation (4) above.

In accordance with various embodiments, circuits or systems may be configured to perform particular operations or actions by virtue of having hardware, software, firmware, or a combination of them installed on the system that in operation causes or cause the system to perform the actions. One general aspect includes a method of operating a switched-mode power converter including a switch, a freewheeling diode coupled between an output terminal of the switch and a power supply input node, an inductor coupled between the output terminal of the switch and a power supply output node, and a passive network having a first terminal coupled to the output terminal of the switch, a second terminal coupled to a power supply output node, and a third terminal coupled to a reference terminal of the switch. The method includes measuring a first voltage at a fourth terminal of the passive measurement coupling network when the switch is on; measuring a second voltage at the fourth terminal of the passive measurement coupling network when the switch is off; and estimating an output voltage between the power supply output node and the reference terminal of the switch based on the first voltage and the second voltage. Other embodiments of this aspect include corresponding circuits and systems configured to perform the various actions of the methods.

Implementations may include one or more of the following features. The method where the passive measurement coupling network includes: a first resistor coupled between the second terminal and the fourth terminal of the passive measurement coupling network; a second resistor coupled between the first terminal and the fourth terminal of the passive measurement coupling network; and a third resistor coupled between the third terminal and third terminal of the passive measurement coupling network. Measuring the first voltage may include sampling the first voltage when the switch is on to form a first sampled voltage; and measuring the second voltage may include sampling the first voltage when the switch is off to form a second sampled voltage.

In an embodiment, the method further includes turning off the switch; determining when a current through the freewheeling diode reaches zero after turning off the switch; and sampling the first voltage when the switch is off includes sampling the first voltage when the current through the freewheeling diode reaches zero based on the determining. Determining when the current through the freewheeling diode reaches zero may include monitoring a voltage at the output terminal of the switch. In an embodiment, estimating the output voltage includes subtracting a value of the first voltage from a value of the second voltage. Subtracting may include applying a first weight to the first sampled voltage and applying a second weight to the second sampled voltage prior to the subtracting. In some embodiments, the first weight is twice the second weight.

In an embodiment, the method further includes converting the first sampled voltage to a first current and converting the second sampled voltage to a second current, where estimating the output voltage includes subtracting the first current from the second current. The method may further include comparing the estimated output voltage to a predetermined threshold, and/or may include shutting down the switched-mode power converter when the estimated output voltage exceeds the predetermined threshold. Implementations of the described techniques may include hardware, a method or process, or computer software on a computer-accessible medium.

A further general aspect includes a controller configured to control a switched-mode power supply that includes a switch, a freewheeling diode coupled between an output terminal of the switch and a power supply input node, an inductor coupled between the output terminal of the switch and a power supply output node, and a passive network having a first terminal coupled to the output terminal of the switch, a second terminal coupled to a power supply output node, and a third terminal coupled to a reference terminal of the switch. The controller includes a voltage measuring circuit having an input terminal configured to be coupled to a fourth terminal of the passive measurement coupling network. The voltage measuring circuit is configured to measure a first voltage at a fourth terminal of the passive measurement coupling network when the switch is on and measure a second voltage at the fourth terminal of the passive measurement coupling network when the switch is off. The controller further includes an output voltage estimation circuit coupled to an output of the voltage measuring circuit. The output voltage estimation circuit configured to estimate an output voltage between the power supply output node and the reference terminal of the switch based on the first voltage and the second voltage. Other embodiments of this aspect include corresponding circuits and systems configured to implement the claimed system.

Implementations may include one or more of the following features. The controller where the passive measurement coupling network includes: a first resistor coupled between the second terminal and the fourth terminal of the passive measurement coupling network; a second resistor coupled between the first terminal and the fourth terminal of the passive measurement coupling network; and a third resistor coupled between the third terminal and third terminal of the passive measurement coupling network. In an embodiment, the output voltage measuring circuit includes: a first sample and hold circuit having a first sampling input coupled to the input terminal of the voltage measuring circuit; and a second sample and hold circuit having a second sampling input coupled to the input terminal of the voltage measuring circuit. The first sample and hold circuit may further include a first sample control input coupled to a control signal for the switch. The first sample and hold circuit may be configured to sample the first sampling input when the control signal is in a first state. The second sample and hold circuit may further include a second sample control input coupled to a control signal for the switch, such that the second sample and hold circuit configured to sample the second sampling input when the control signal is in a first second state different from the first state.

In an embodiment, the output voltage estimation circuit includes: a first transconductance amplifier coupled to an output of the first sample and hold circuit; a second transconductance amplifier coupled to an output of the first sample and hold circuit; and a current subtraction circuit configured to produce a current proportional to the estimated output voltage. The current subtraction circuit includes a first input coupled to the output of the first transconductance amplifier, and a second input coupled to the output of the second sample and hold circuit. The output of the current subtraction circuit may provide a signal proportional to an output of the second transconductance amplifier minus two-times the output of the first transconductance amplifier.

In an embodiment, the controller further includes a comparator configured to compare an output of the output voltage estimation circuit with a predetermined threshold, and to shut down the switched-mode power supply when the output of the output voltage estimation circuit exceeds the predetermined threshold. In some embodiments, the controller further includes the switch and a pulse-width modulator coupled to a control node of the switch. The voltage measuring circuit, the output voltage estimation circuit, the switch and the pulse-width modulator may be disposed on a semiconductor substrate. In some embodiments, the switched-mode power supply further includes a cascode transistor having a load path coupled between the output terminal of the switch and the second terminal of the inductor. Implementations of the described techniques may include hardware, a method or process, or computer software on a computer-accessible medium.

One general aspect includes a switched-mode power supply including: a switch; a pulse modulator circuit having an output coupled to a control node of the switch; a freewheeling diode coupled between an output terminal of the switch and a power supply input node; an inductor having a first terminal coupled to an output terminal of the switched-mode power supply, and a second terminal coupled to the output terminal of the switch; a voltage sampling circuit configured to sample a sampling input terminal when the output of the pulse modulator is in a first state to obtain a first sample value, and to sample the sampling input terminal when the output of the pulse modulated is in a second state to obtain a second sample value. The switched-mode power supply further includes a first resistor coupled between the first terminal of the inductor and the sampling input terminal of the voltage sampling circuit; a second resistor coupled between the second terminal of the inductor and the sampling input terminal of the voltage sampling circuit; a third resistor coupled between a reference terminal of the switch and the sampling input terminal of the voltage sampling circuit. An output voltage estimation circuit is coupled to an output of the voltage sampling circuit and is configured to estimate an output voltage between output terminal of the switched-mode power supply and the reference terminal of the switch by subtracting the first sampled value from the second sample value. Other embodiments of this aspect include corresponding circuits and systems configured to perform the various actions of the methods.

Implementations may include one or more of the following features. The switched-mode power supply may further include a cascode transistor having a load path coupled between the output terminal of the switch and the second terminal of the inductor. In some embodiments, the switched-mode power supply further includes a light emitting diode (LET) coupled between the power supply input node and the output terminal of the switched-mode power supply. In some embodiments, the switched-mode power supply further includes a rectifier coupled between an AC input port and the power supply input node. Implementations of the described techniques may include hardware, a method or process, or computer software on a computer-accessible medium.

Advantages of some embodiments include the ability to accurately estimate the output voltage of a switched-mode power supply without using an auxiliary winding. Some advantageous embodiments only need an extra three external resistors coupled to an input pin of a controller IC. A further advantage of embodiments includes the ease of system design in which an output over voltage threshold can be adjusted externally.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. In addition, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. In addition, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of intraoperative hardware units, including one or more processors as described above, in conjunction with suitable software and/or firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of operating a switched-mode power converter comprising a switch, a freewheeling diode coupled between an output terminal of the switch and a power supply input node, an inductor coupled between the output terminal of the switch and a power supply output node, and a passive measurement coupling network having a first terminal coupled to the output terminal of the switch, a second terminal coupled to the power supply output node, and a third terminal coupled to a reference terminal of the switch, the method comprising:
    measuring a first voltage at a fourth terminal of the passive measurement coupling network when the switch is on, wherein measuring the first voltage comprises sampling the first voltage when the switch is on to form a first sampled voltage;
    measuring a second voltage at the fourth terminal of the passive measurement coupling network when the switch is off, wherein measuring the second voltage comprises sampling the second voltage when the switch is off to form a second sampled voltage; and
    estimating an output voltage between the power supply input node and the power supply output node based on the first voltage and the second voltage, wherein estimating the output voltage comprises subtracting a value of the first voltage from a value of the second voltage.

2. The method of claim 1, wherein the passive measurement coupling network comprises:
    a first resistor coupled between the second terminal and the fourth terminal of the passive measurement coupling network;
    a second resistor coupled between the first terminal and the fourth terminal of the passive measurement coupling network; and
    a third resistor coupled between the third terminal and the fourth terminal of the passive measurement coupling network.

3. The method of claim 1, further comprising:
    turning off the switch;
    determining when a current through the freewheeling diode reaches zero after turning off the switch; and
    sampling the second voltage when the switch is off comprises sampling the second voltage when the current through the freewheeling diode reaches zero based on the determining.

4. The method of claim 3, wherein determining when the current through the freewheeling diode reaches zero comprises monitoring a voltage at the output terminal of the switch.

5. The method of claim 1, wherein subtracting comprises applying a first weight to the first sampled voltage and applying a second weight to the second sampled voltage prior to the subtracting.

6. The method of claim 5, wherein the first weight is twice the second weight.

7. The method of claim 1, further comprising:
    converting the first sampled voltage to a first current; and
    converting the second sampled voltage to a second current, wherein estimating the output voltage comprises subtracting the first current from the second current.

8. The method of claim 1, further comprising comparing the estimated output voltage to a predetermined threshold.

9. The method of claim 8, further comprising shutting down the switched-mode power converter when the estimated output voltage exceeds the predetermined threshold.

10. A controller configured to control a switched-mode power supply that includes a switch, a freewheeling diode coupled between an output terminal of the switch and a power supply input node, an inductor coupled between the output terminal of the switch and a power supply output node, and a passive measurement coupling network having a first terminal coupled to the output terminal of the switch, a second terminal coupled to a power supply output node, and a third terminal coupled to a reference terminal of the switch, the controller comprising:
    a voltage measuring circuit having an input terminal configured to be coupled to a fourth terminal of the passive measurement coupling network, the voltage measuring circuit configured to measure a first voltage at a fourth terminal of the passive measurement coupling network when the switch is on and measure a second voltage at the fourth terminal of the passive measurement coupling network when the switch is off, wherein the voltage measuring circuit comprises
        a first sample and hold circuit having a first sampling input coupled to the input terminal of the voltage measuring circuit, and
        a second sample and hold circuit having a second sampling input coupled to the input terminal of the voltage measuring circuit; and
    an output voltage estimation circuit coupled to an output of the voltage measuring circuit, the output voltage estimation circuit configured to estimate an output voltage between the power supply input node and the power supply output node based on the first voltage and the second voltage, wherein the output voltage estimation circuit comprises
        a first transconductance amplifier coupled to an output of the first sample and hold circuit,
        a second transconductance amplifier coupled to an output of the first sample and hold circuit, and
        a current subtraction circuit configured to produce a current proportional to the estimated output voltage, the current subtraction circuit comprising a first input coupled to the output of the first transconductance amplifier, and a second input coupled to the output of the second sample and hold circuit.

11. The controller of claim 10, wherein the passive measurement coupling network comprises:
    a first resistor coupled between the second terminal and the fourth terminal of the passive measurement coupling network;
    a second resistor coupled between the first terminal and the fourth terminal of the passive measurement coupling network; and a third resistor coupled between the third terminal and the fourth terminal of the passive measurement coupling network.

12. The controller of claim 10, wherein:
the first sample and hold circuit further comprises a first sample control input coupled to a control signal for the switch, the first sample and hold circuit configured to sample the first sampling input when the control signal is in a first state; and
the second sample and hold circuit further comprises a second sample control input coupled to a control signal for the switch, the second sample and hold circuit configured to sample the second sampling input when the control signal is in a second state different from the first state.

13. The controller of claim 10, wherein the output of the current subtraction circuit provides a signal proportional to an output of the second transconductance amplifier minus two-times the output of the first transconductance amplifier.

14. The controller of claim 10, further comprising a comparator configured to compare an output of the output voltage estimation circuit with a predetermined threshold, and to shut down the switched-mode power supply when the output of the output voltage estimation circuit exceeds the predetermined threshold.

15. The controller of claim 10, further comprising:
the switch; and
a pulse-width modulator coupled to a control node of the switch.

16. The controller of claim 15, wherein the voltage measuring circuit, the output voltage estimation circuit, the switch and the pulse-width modulator are disposed on a semiconductor substrate.

17. A switched-mode power supply comprising:
a switch;
a pulse modulator circuit having an output coupled to a control node of the switch;
a freewheeling diode coupled between an output terminal of the switch and a power supply input node;
an inductor having a first terminal coupled to an output terminal of the switched-mode power supply, and a second terminal coupled to the output terminal of the switch;
a voltage sampling circuit configured to sample a sampling input terminal when the output of the pulse modulator circuit is in a first state to obtain a first sample value, and to sample the sampling input terminal when the output of the pulse modulator circuit is in a second state to obtain a second sample value;
a first resistor coupled between the first terminal of the inductor and the sampling input terminal of the voltage sampling circuit;
a second resistor coupled between the second terminal of the inductor and the sampling input terminal of the voltage sampling circuit;
a third resistor coupled between a reference terminal of the switch and the sampling input terminal of the voltage sampling circuit; and
an output voltage estimation circuit coupled to an output of the voltage sampling circuit, the output voltage estimation circuit configured to estimate an output voltage between the power supply input node and the output terminal of the switched-mode power supply by subtracting the first sampled value from the second sample value.

18. The switched-mode power supply of claim 17, further comprising a cascode transistor having a load path coupled between the output terminal of the switch and the second terminal of the inductor.

19. The switched-mode power supply of claim 17, further comprising a light emitting diode (LED) coupled between the power supply input node and the output terminal of the switched-mode power supply.

20. The switched-mode power supply of claim 17, further comprising a rectifier coupled between an AC input port and the power supply input node.

21. A method of operating a switched-mode power converter comprising a switch, a freewheeling diode coupled between an output terminal of the switch and a power supply input node, an inductor coupled between the output terminal of the switch and a power supply output node, and a passive measurement coupling network having a first terminal coupled to the output terminal of the switch, a second terminal coupled to the power supply output node, and a third terminal coupled to a reference terminal of the switch, the method comprising:
measuring a first voltage at a fourth terminal of the passive measurement coupling network when the switch is on, wherein measuring the first voltage comprises sampling the first voltage when the switch is on to form a first sampled voltage;
measuring a second voltage at the fourth terminal of the passive measurement coupling network when the switch is off, wherein measuring the second voltage comprises sampling the second voltage when the switch is off to form a second sampled voltage;
estimating an output voltage between the power supply input node and the power supply output node based on the first voltage and the second voltage;
converting the first sampled voltage to a first current; and
converting the second sampled voltage to a second current, wherein estimating the output voltage comprises subtracting the first current from the second current.

* * * * *